United States Patent
Kotsuji et al.

(10) Patent No.: US 10,316,955 B2
(45) Date of Patent: Jun. 11, 2019

(54) LUBRICANT FLOWRATE CONTROL DEVICE OF AUTOMATIC TRANSMISSION AND LUBRICANT FLOWRATE CONTROL METHOD

(71) Applicants: JATCO LTD, Fuji-shi, Shizuoka (JP); NISSAN MOTOR CO., LTD., Yokohama-shi, Kanagawa (JP)

(72) Inventors: Kouichi Kotsuji, Numazu (JP); Akira Sugimura, Sagamihara (JP); Atsushi Maeda, Fujinomiya (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 772 days.

(21) Appl. No.: 14/777,677

(22) PCT Filed: Dec. 27, 2013

(86) PCT No.: PCT/JP2013/085188
§ 371 (c)(1),
(2) Date: Sep. 16, 2015

(87) PCT Pub. No.: WO2014/147920
PCT Pub. Date: Sep. 25, 2014

(65) Prior Publication Data
US 2016/0298755 A1 Oct. 13, 2016

(30) Foreign Application Priority Data
Mar. 19, 2013 (JP) ................. 2013-056889

(51) Int. Cl.
*F16H 57/04* (2010.01)
*F16H 61/00* (2006.01)
(Continued)

(52) U.S. Cl.
CPC ......... *F16H 57/0435* (2013.01); *B60K 6/365* (2013.01); *B60K 6/387* (2013.01);
(Continued)

(58) Field of Classification Search
CPC ............. F16H 57/0435; F16H 57/0473; F16H 61/0021; F16H 61/0031
See application file for complete search history.

(56) References Cited

U.S. PATENT DOCUMENTS 5,961,419 A * 10/1999 Hisano ................ F16H 57/0413
184/6.12
2004/0112171 A1* 6/2004 Kuhstrebe .............. B60K 6/485
74/730.1
(Continued)

FOREIGN PATENT DOCUMENTS

JP 10-141480 A 8/2013
JP 2013-151175 A 8/2013

*Primary Examiner* — Edwin A Young
(74) *Attorney, Agent, or Firm* — Foley & Lardner LLP (57) ABSTRACT

The integrated controller calculates the required lubricant flowrate required for lubricating the friction element corresponding to a selected position on the basis of a rotation speed difference in the friction element corresponding to the selected position, and increases the lubricant flowrate supplied to the friction element corresponding to the selected position immediately after switching is made between the forward position and the reverse position and supplies the lubricant flowrate larger than the required lubricant flowrate to the friction element corresponding to the selected position.

13 Claims, 8 Drawing Sheets

(51) Int. Cl.
  *B60K 6/365*   (2007.10)
  *B60K 6/387*   (2007.10)
  *B60K 6/46*    (2007.10)
  *B60K 6/543*   (2007.10)
  *F16H 37/02*   (2006.01)
  *F16H 37/08*   (2006.01)
  *F16H 59/46*   (2006.01)

(52) U.S. Cl.
  CPC ............... *B60K 6/46* (2013.01); *B60K 6/543* (2013.01); *F16H 37/022* (2013.01); *F16H 37/0813* (2013.01); *F16H 57/0473* (2013.01); *F16H 57/0489* (2013.01); *F16H 61/0021* (2013.01); *F16H 61/0031* (2013.01); *B60Y 2200/92* (2013.01); *F16H 57/0446* (2013.01); *F16H 59/46* (2013.01); *F16H 2061/0037* (2013.01); *Y10S 903/91* (2013.01); *Y10S 903/914* (2013.01); *Y10S 903/918* (2013.01); *Y10S 903/93* (2013.01)

(56)         References Cited

U.S. PATENT DOCUMENTS

2004/0127320 A1\*   7/2004   Inoue .................. F16H 61/0021
                                                    475/210
2005/0172740 A1\*   8/2005   Ebihara ................. B60K 17/28
                                                    74/15.4
2013/0191012 A1    7/2013   Hirotsu et al.

\* cited by examiner

LUBRICANT FLOWRATE CONTROL DEVICE OF AUTOMATIC TRANSMISSION AND LUBRICANT FLOWRATE CONTROL METHOD

TECHNICAL FIELD

The present invention relates to a technology for controlling a lubricant flowrate supplied to an automatic transmission.

BACKGROUND ART

A transmission mechanism unit of an automatic transmission is constituted by including friction elements such as a brake, a clutch and the like. In order to prevent deterioration of durability of the friction element caused by overheat of the friction elements, supply of a lubricant flowrate according to heat generation amounts of the friction elements to the friction elements is important.

In the automatic transmission disclosed in JP10-141480A, a heat generation amount is calculated on the basis of a rotation speed difference between an input-side element and an output-side element of the friction element, and a lubricant flowrate according to the calculated heat generation amount is supplied to the friction element.

SUMMARY OF INVENTION

A detected value of a rotation speed sensor is used for the calculation of the rotation speed difference in the friction element. A projection portion is usually provided on an outer periphery of a rotation element whose rotation speed is to be detected, and the rotation speed sensor is constituted by a pulse generating device generating a pulse when this projection portion passes by the sensor. In this type of rotation speed sensor, since a rotating direction cannot be detected, a select position (a state of a select lever or a select switch for switching among forward, reverse, neutral, and parking) of the transmission is referred to, and the rotating direction of the detected rotation speed is determined.

However, if the select position of the transmission is switched from a reverse position (R) to a forward position (D, L, 2, 1 and the like) before a vehicle is stopped (before a car speed becomes zero), the output-side element of the friction element does not immediately change to a forward rotation (rotation in the forward direction) but stays in a reverse rotation (rotation in the reverse direction). Thus, with the above-described method of determining the rotating direction by referring to the select position, erroneous determination is made that the output-side element of the friction element is making a forward rotation.

If the above-described erroneous determination is made, the rotation speed difference in the friction element is calculated smaller than an actual rotation speed difference, and in a constitution in which the lubricant amount according to the calculated rotation speed difference is supplied to the friction element, the lubricant flowrate of the friction element runs short, which results in deterioration of durability of the friction element caused by overheat of the friction element.

The same applies to switching of the select position of the transmission from the forward position to the reverse position.

An object of the present invention is to supply a sufficient lubricant flowrate to the friction element and to prevent deterioration of durability of the friction element caused by overheat of the friction element due to an insufficient lubricant flowrate even if the select position is switched between the reverse position and the forward position and the rotation speed difference in the friction element cannot be accurately calculated.

According to an aspect of the present invention, a lubricant flowrate control device for controlling a lubricant flowrate supplied to an automatic transmission provided with a forward friction element engaged when a forward position is selected and a reverse friction element engaged when a reverse position is selected between a driving source and a driving wheel, is provided. The lubricant flowrate control device includes required lubricant flowrate calculating means adapted to calculate a required lubricant flowrate required for lubricating the friction element corresponding to a selected position on the basis of a rotation speed difference in the friction element corresponding to the selected position, and lubricant flowrate controlling means adapted to supply the required lubricant flowrate to the friction element corresponding to the selected position. The lubricant flowrate controlling means increases the lubricant flowrate supplied to the friction element corresponding to the selected position immediately after switching is made between the forward position and the reverse position and supplies the lubricant flowrate larger than the required lubricant flowrate to the friction element corresponding to the selected position.

A corresponding lubricant flowrate control method is also provided.

According to these aspects, immediately after switching of the select position is made between the reverse position and the forward position, the lubricant flowrate larger than the calculated required lubricant flowrate is supplied to the friction element. Thus, the deterioration of durability of the friction element caused by overheat of the friction element due to an insufficient lubricant flowrate can be be prevented.

DESCRIPTION OF EMBODIMENTS

An embodiment of the present invention will be described below by referring to the attached drawings.

Figure 1:
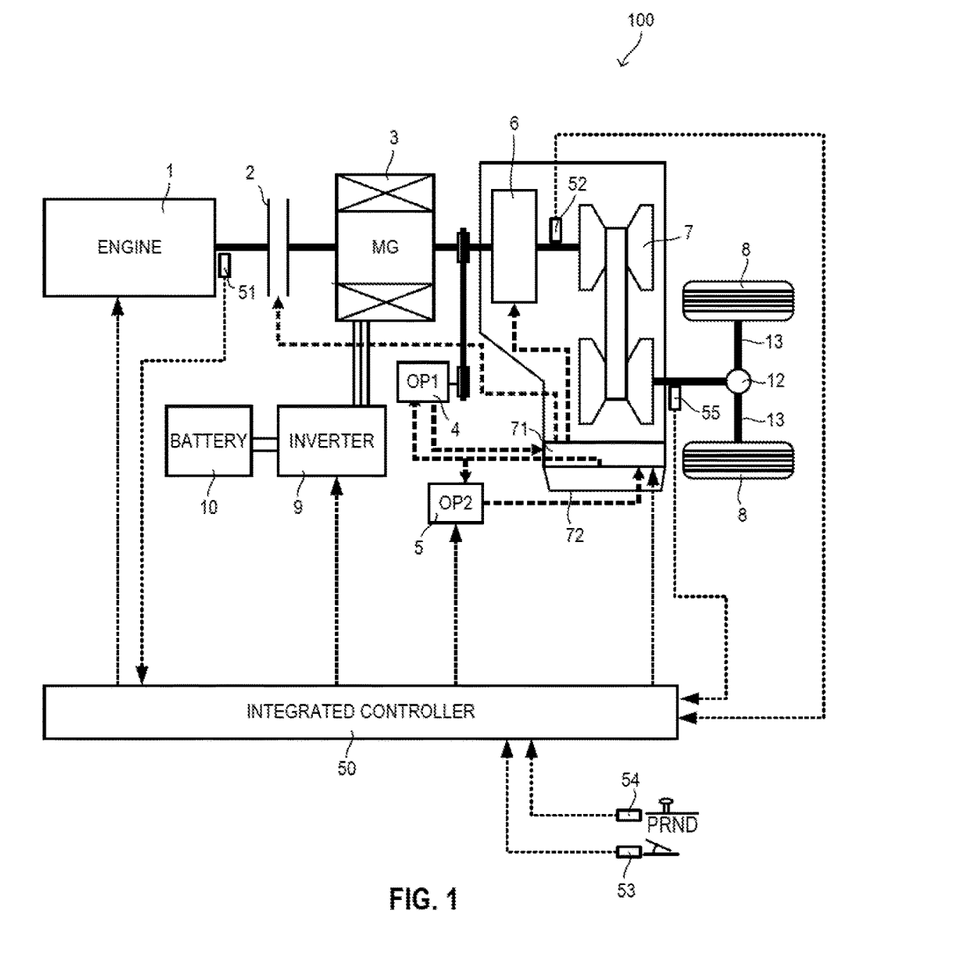
FIG. 1 is an entire configuration view of a hybrid vehicle.

FIG. 1 is an entire configuration view of a hybrid vehicle (hereinafter referred to as a vehicle) 100. The vehicle 100 includes an engine 1, a mode switching clutch 2, a motor generator (hereinafter referred to an MG) 3, a first oil pump 4, a second oil pump 5, a forward/backward switching mechanism 6, a continuously variable transmission (hereinafter referred to as a CVT) 7, driving wheels 8, and an integrated controller 50.

The engine 1 is an internal combustion engine using gasoline, diesel fuel or the like as a fuel, and a rotation speed, a torque and the like are controlled on the basis of an engine control instruction from the integrated controller 50.

The mode switching clutch 2 is a normally-open hydraulic driven clutch interposed between the engine 1 and the MG 3. The mode switching clutch 2 has its engaged/disengaged state controlled by a control hydraulic pressure created by a hydraulic control valve unit 71 on the basis of a mode switching instruction from the integrated controller 50. A dry multi-plate clutch is used as the mode switching clutch 2, for example.

The MG 3 is a synchronous rotary electric motor in which a permanent magnet is embedded in a rotor and a stator coil is wound around a stator. The MG 3 is controlled by applying a three-phase AC current crated by an inverter 9 on the basis of an MG control instruction from the integrated controller 50. The MG 3 can be operated as an electric motor driven by receiving supply of power from a battery 10. Moreover, the MG 3 functions as a power generator generating an electromotive force on both ends of the stator coil and can charge the battery 10 when the rotor receives rotary energy from the engine 1 or the driving wheels 8.

The first oil pump 4 is a vane pump driven by the engine 1 or the MG 3. The first oil pump 4 pumps up an operating oil stored in an oil pan 72 of the CVT 7 and supplies a hydraulic pressure to the hydraulic control valve unit 71.

The second oil pump 5 is an electric oil pump operated by receiving supply of power from the battery 10. The second oil pump 5 is driven when an oil amount is insufficient only by the first oil pump 4 on the basis of an instruction from the integrated controller 50, pumps up the operating oil stored in the oil pan 72 of the CVT 7 similarly to the first oil pump 4 and supplies the hydraulic pressure to the hydraulic control valve unit 71.

Figure 2:
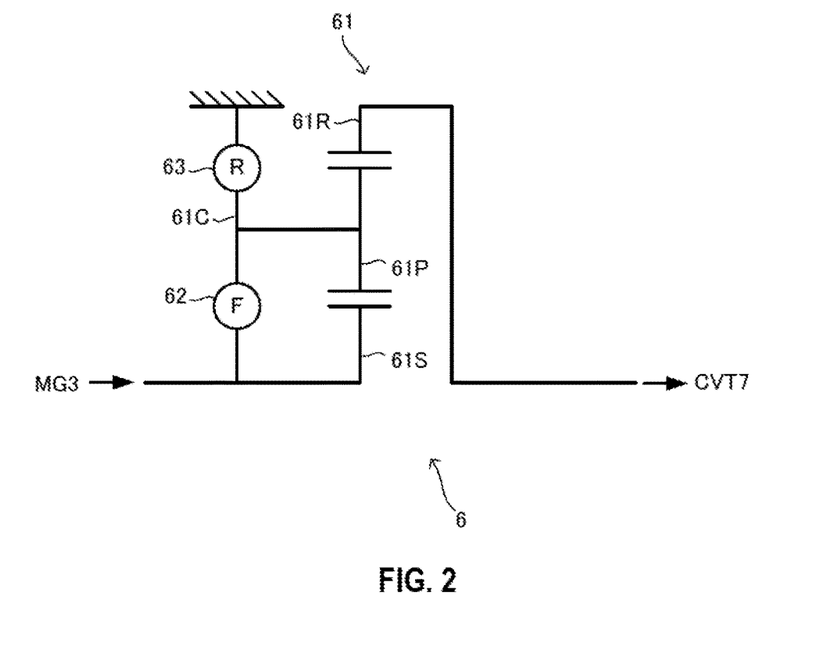
FIG. 2 is an outline configuration view of a forward/reverse switching mechanism.

The forward/reverse switching mechanism 6 is interposed between the MG3 and the CVT 7. The forward/reverse switching mechanism 6 is constituted by a planetary gear 61, a forward clutch 62, and a reverse brake 63, as illustrated in FIG. 2. The planetary gear 61 is constituted by a sun gear 61S, a pinion gear 61P, a ring gear 61R, and a carrier 61C, and a rotating shaft of the ring gear 61R is connected to the CVT 7, and a rotating shaft of the sun gear 61S is connected to the MG 3.

The forward clutch 62 is a clutch for coupling the sun gear 61S and the carrier 61C with each other through engagement. The reverse brake 63 is a brake coupling the carrier 61C with a transmission case, unable of relative rotation, through engagement. By engaging the forward clutch 62 and by disengaging the reverse brake 63, a forward state in which rotations of the engine 1 and the MG3 are transmitted to the CVT 7 as they are is realized. On the other hand, by disengaging the forward clutch 62 and by engaging the reverse brake 63, a reverse state in which the rotations of the engine 1 and the MG 3 are reduced and also reversed and transmitted to the CVT 7 is realized.

The forward clutch 62 and the reverse brake 63 have engagement/disengagement controlled by a control hydraulic pressure created by the hydraulic control valve unit 71 on the basis of a forward/reverse switching instruction from the integrated controller 50. A normally-open wet multi-plate clutch, for example, is used for the forward clutch 62 and the reverse brake 63.

Returning to FIG. 1, the CVT 7 is arranged on a downstream side of the MG 3 and can continuously vary a speed ratio in accordance with the vehicle speed, an accelerator opening degree and the like. The CVT 7 includes a primary pulley, a secondary pulley and a belt extended between the both pulleys. A primary pulley pressure and a secondary pulley pressure are created by using discharge pressures from the first oil pump 4 and the second oil pump 5 as source pressures, a movable pulley of the primary pulley and a movable pulley of the secondary pulley are moved by the pulley pressures in an axial direction, and a pulley contact radius of the belt is changed so that the speed ratio is continuously varied.

A differential 12 is connected to an output shaft of the CVT 7 through a final reduction gear mechanism, not shown, and the driving wheels 8 are connected to the differential 12 through drive shafts 13.

Into the integrated controller 50, signals from a rotation speed sensor 51 for detecting the rotation speed of the engine 1, a rotation speed sensor 52 for detecting an output rotation speed (=input rotation speed of the CVT 7) of the forward/reverse switching mechanism 6, an accelerator opening-degree sensor 53 for detecting an accelerator opening degree, an inhibitor switch 54 for detecting a select position (state of a select lever or a select switch switching among forward, reverse, neutral, and parking) of the CVT 7, a vehicle speed sensor 55 for detecting the vehicle speed and the like are inputted, and the integrated controller 50 executes various controls to the engine 1, the MG 3 (inverter 9), and the CVT 7 on the basis of them.

The rotation speed sensor 52 is constituted by a pulse generating device generating a pulse when a projection portion provided on an outer periphery of a rotation element whose rotating speed is to be detected passes by the sensor. Since the rotation speed sensor 52 can detect only the rotation speed and cannot detect a rotating direction, the rotating direction is determined on the basis of the select position of the CVT 7 detected by the inhibitor switch 54. That is, if the select position is at the forward position (D, L, 2, 1 and the like), it is determined that the rotating direction is a forward direction, while if it is at the reverse position (R), it is determined that the rotating direction is a reverse direction.

Moreover, the integrated controller 50 switches a driving mode of the vehicle 100 between an EV mode and an HEV mode.

The EV mode is a mode of running only with the MG 3 as a driving source while the mode switching clutch 2 is in a disengaged state. The EV mode is selected when a required driving force is low, and a charged amount of the battery 10 is sufficient.

The HEV mode is a mode for running with the engine 1 and the MG 3 as the driving source while the mode switching clutch 2 is in an engaged state. The HEV mode is selected when the required driving force is high or the charged amount of the battery 10 is insufficient.

The vehicle 100 is not provided with a torque converter as in a conventional vehicle equipped with an automatic transmission. Thus, at start, the forward clutch 62 or the reverse brake 63 is made to slip.

Therefore, as compared with a case provided with the torque converter, there are many operation regions in which the forward clutch 62 or the reverse brake 63 is made to slip and thus, supply of the lubricant flowrate according to the heat generation amount of the friction element is important.

Thus, the integrated controller 50 monitors the rotation speed difference in the friction element (the forward clutch 62 for the forward position and the reverse brake 63 for the reverse position) corresponding to the select position and calculates a heat generation amount according to the rotation speed difference and moreover, a required lubricant flowrate as will be described below. The integrated controller 50 compares the calculated required lubricant flowrate with a lubricant flowrate that can be supplied to the friction element corresponding to the select position only by the first oil pump 4, and if the required lubricant flowrate cannot be ensured only by the first oil pump 4, the second oil pump 5 is driven so that the lubricant flowrate to be supplied to the friction element corresponding to the select position does not run short (normal flowrate control).

Moreover, if the select position of the CVT 7 is switched between the forward position and the reverse position before the vehicle is stopped (before the vehicle speed becomes zero), a state in which the vehicle 100 runs backward regardless of the forward select position is brought about or to the contrary a state in which the vehicle 100 advances regardless of the reverse position is brought about immediately after that, and the rotation speed difference in the friction element corresponding to the select position cannot be correctly calculated with the detected value of the rotation speed sensor 52 which cannot discriminate the rotating direction. Thus, the integrated controller 50 drives the second oil pump 5 even in this state so that the lubricant flowrate does not run short (flowrate control in specific select operation).

Contents of the lubricant flowrate control (normal flowrate control and flowrate control in specific select operation) executed by the integrated controller 50 will be described.

Figure 3:
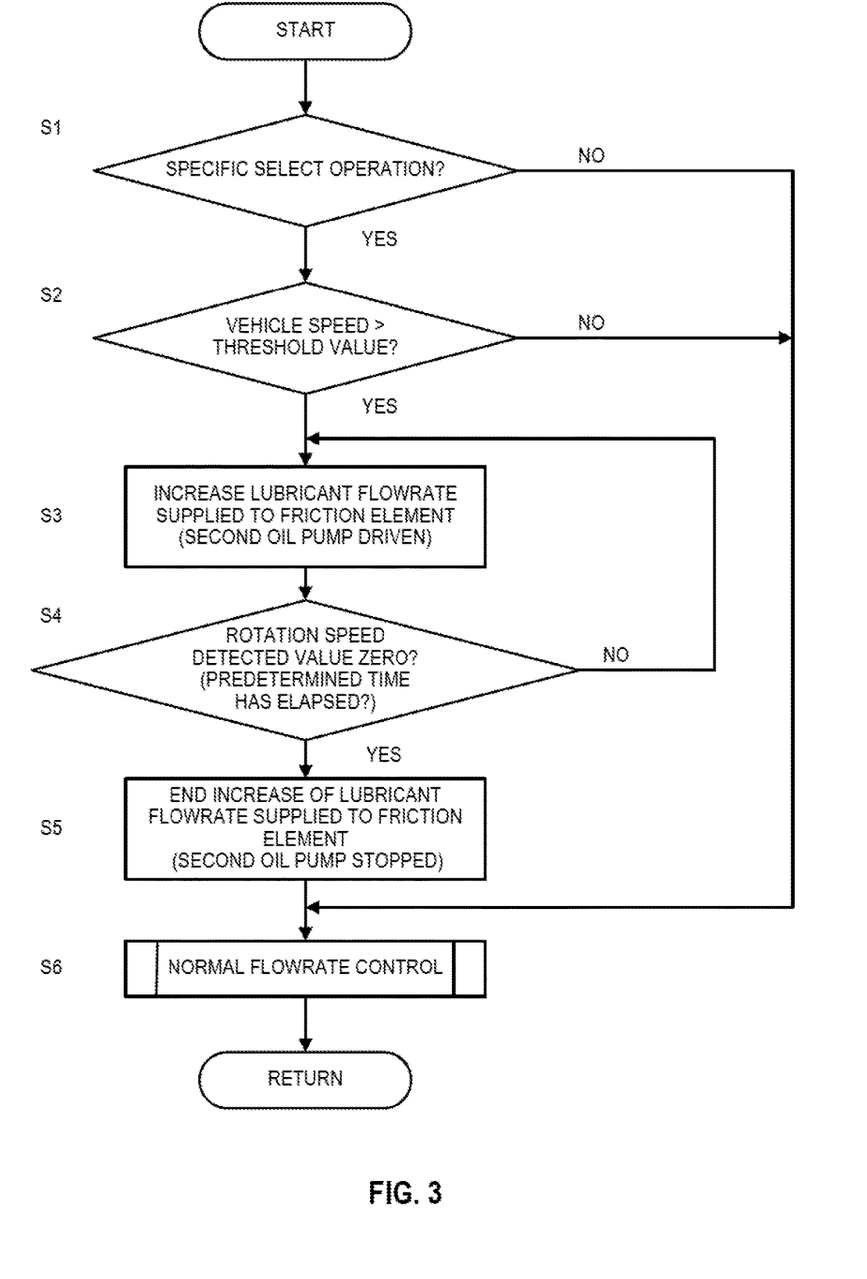
FIG. 3 is a flowchart illustrating contents of a main routine of lubricant flowrate control.

FIG. 3 is a flowchart illustrating the contents of a main routine of the lubricant flowrate control by the integrated controller 50.

At S1, the integrated controller 50 determines whether or not the specific select operation has been performed on the basis of a signal from the inhibitor switch 54. The specific select operation is an operation from the reverse position to the forward position or an operation from the forward position to the reverse position.

If it is determined that the specific select operation has been performed, the processing proceeds to S2, while if not, the processing proceeds to S6.

At S2, the integrated controller 50 determines whether or not the vehicle speed is higher than a threshold value. The threshold value is set to a lowest value of a vehicle speed (predetermined low vehicle speed) at which overheat of the friction element caused by shortage of the lubricant flowrate can be a problem if the lubricant flowrate supplied to the friction element corresponding to the select position runs short.

At S3 to S5, the integrated controller 50 executes the flowrate control in a specific select operation. Specifically, the integrated controller 50 drives the second oil pump 5 so that the discharge flowrate becomes the maximum discharge flowrate so as to increase the lubricant flowrate supplied to the friction element corresponding to the select position (S3).

The integrated controller 50 continues the increase of the lubricant flowrate supplied to the friction element corresponding to the select position by driving the second oil pump 5 until it is determined that at least the detected value of the rotation speed sensor 52 becomes zero. That is because, after the detected value of the rotation speed sensor 25 becomes zero, the rotating direction of the rotation speed detected by the rotation speed sensor 52 matches the traveling direction of the vehicle 100 and thus, erroneous detection of the rotation speed difference is no longer made, and the lubricant flowrate in the friction element no longer runs short even if the control proceeds to the normal flowrate control which will be described later.

In this embodiment, whether the detected value of the rotation speed sensor 52 becomes zero is determined on the basis of whether or not elapsed time since the specific select operation was performed has reached predetermined time (S4). The predetermined time is set to a value obtained by adding allowance time to a value acquired in advance by an experiment or the like as time until the detected value of the rotation speed sensor 52 becomes zero since the specific select operation was performed.

If it is determined that the detected value of the rotation speed sensor 52 becomes zero (the elapsed time since the specific select operation was performed has reached the predetermined time), the integrated controller 50 stops the second oil pump 5 and ends the increase of the lubricant flowrate supplied to the friction element corresponding to the select position (S5).

At S6, the integrated controller 50 executes the normal flowrate control. The normal flowrate control is executed in accordance with a flowchart illustrated in FIG. 4.

Figure 4:
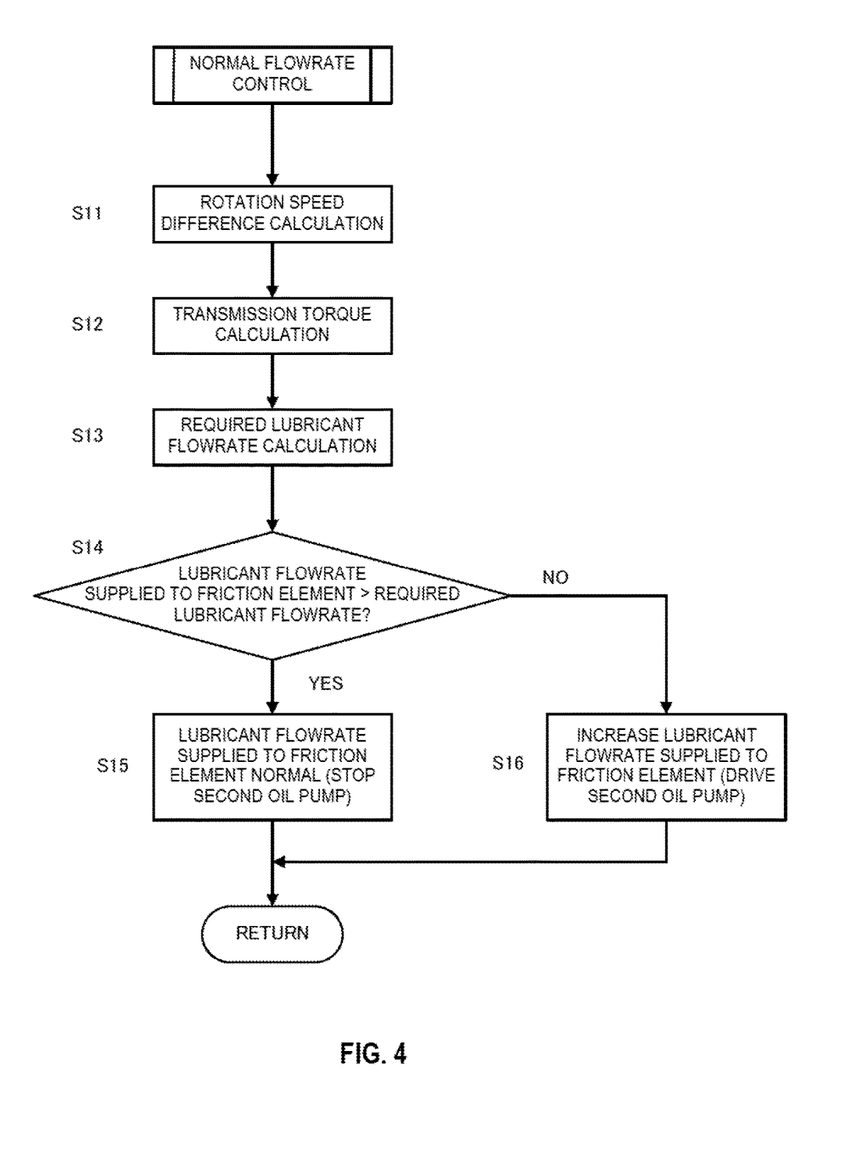
FIG. 4 is a flowchart illustrating contents of a sub routine of the lubricant flowrate control.

FIG. 4 is a flowchart illustrating contents of a sub routine (normal flowrate control) of the lubricant flowrate control by the integrated controller 50.

At S11, the integrated controller 50 calculates the rotation speed difference in the friction element corresponding to the select position. The rotation speed difference can be calculated on the basis of the rotation speed of the MG3 acquired from the MG control instruction and the detected value of the rotation speed sensor 52.

At S12, the integrated controller 50 calculates a transmission torque in the friction element corresponding to the select position. The transmission torque can be calculated as a total value of a torque of the engine 1 and a torque of the MG 3.

At S13, the integrated controller 50 calculates a heat generation amount in the friction element corresponding to the select position on the basis of a value obtained by multiplying the rotation speed difference by the transmission torque and calculates a lubricant flowrate required for cooling the calculated heat generation amount (required lubricant flowrate).

At S14, the integrated controller 50 compares the lubricant flowrate supplied to the friction element corresponding to the select position if only the first oil pump 4 is driven with the required lubricant flowrate. If the former is larger than the latter, that is, the required lubricant flowrate can be supplied to the friction element corresponding to the select position by driving only the first oil pump 4, the second oil pump 5 is not driven (S15). On the other hand, if the former is smaller than the latter, that is, the required lubricant flowrate cannot be supplied to the friction element corresponding to the select position by driving only the first oil pump 4, the second oil pump 5 is driven so that the shortage is supplied from the second oil pump 5 (S16).

Subsequently, a working effect of execution of the above-described lubricant flowrate control will be described.

Figure 5:
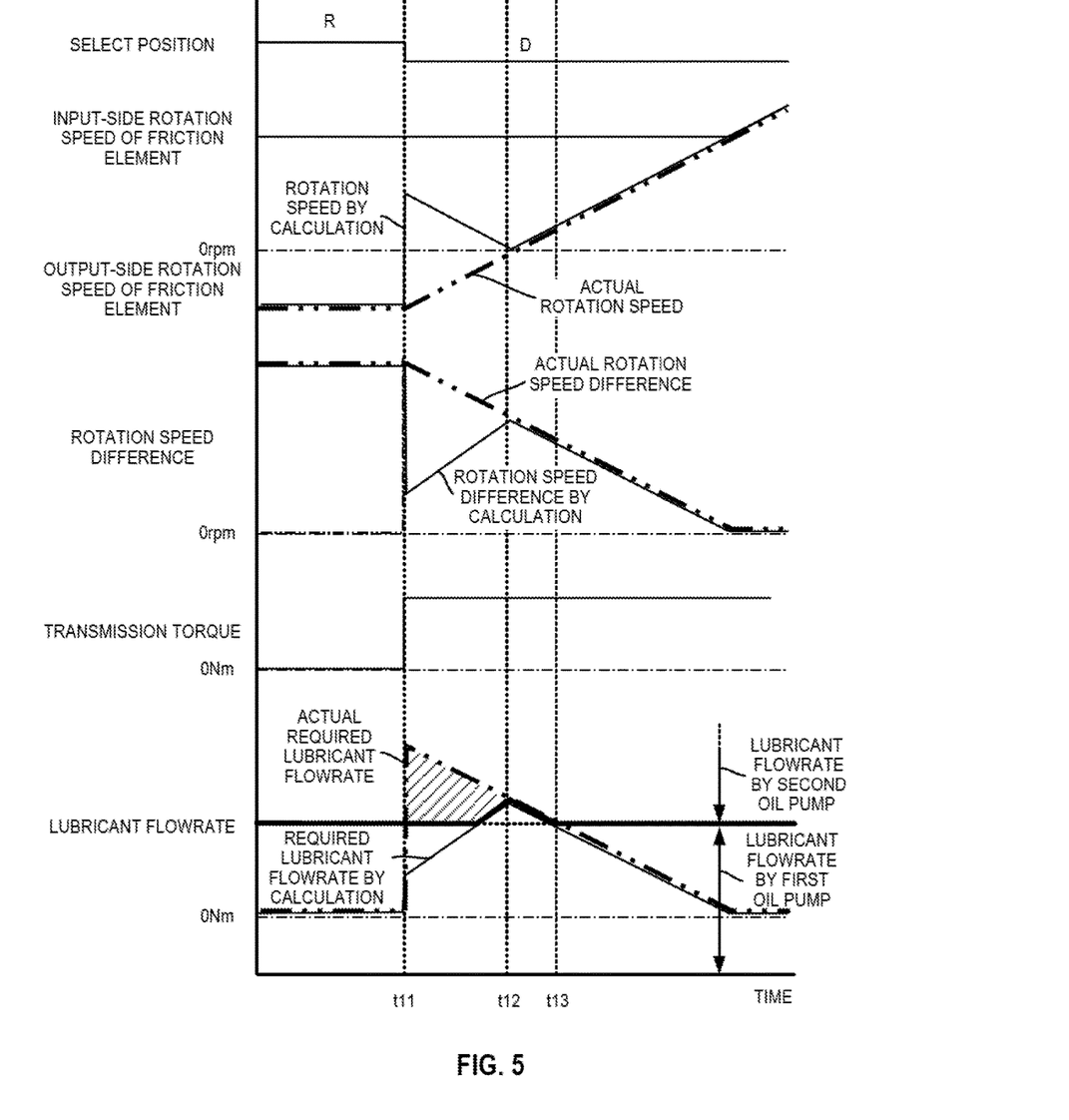
FIG. 5 is a time chart illustrating a state immediately after an R-D select operation (comparative example).

FIG. 5 is a time chart illustrating a state immediately after the select position of the CVT 7 is switched from an R position to a D position if the flowrate control in specific select operation is not executed but only the normal flowrate control is executed (comparative example).

At time t11, the select position is switched from the R position to the D position, but since the traveling direction of the vehicle 100 is not switched immediately to forward, the traveling direction corresponding to the select position becomes opposite to an actual traveling direction of the vehicle 100. Thus, the rotating direction of the rotation speed (output-side rotation speed of the friction element) detected by the rotation speed sensor 52 is determined to be an opposite direction, and the calculated rotation speed difference in the forward clutch 62 becomes lower than the actual rotation speed difference, whereby the calculated required lubricant flowrate becomes smaller.

As a result, during a period from time t11 to time t12, the lubricant flowrate supplied to the forward clutch 62 becomes smaller than an actually required lubricant flowrate (a hatched portion in the figure), and defective lubrication of forward clutch 62 occurs.

Figure 6:
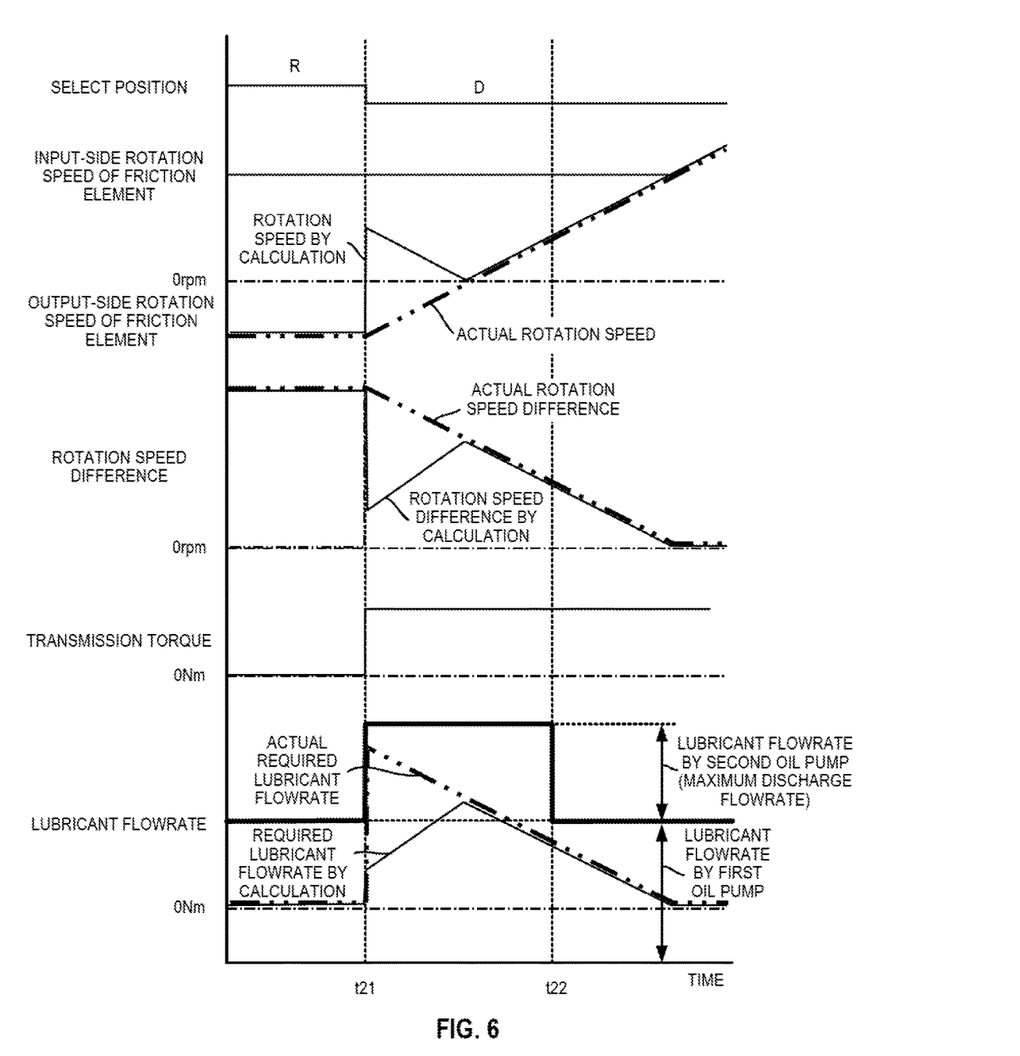
FIG. 6 is a time chart illustrating a state immediately after an R-D select operation (this embodiment).

On the other hand, FIG. 6 is a time chart illustrating a state immediately after the select position of the CVT 7 is switched from the R position to the D position, when the flowrate control in specific select operation is executed in addition to the normal flowrate control (in this embodiment).

When the select position is switched from the R position to the D position at time t21, driving of the second oil pump 5 is started.

Immediately after the select position is switched, similarly to the comparative example in FIG. 5, the rotating direction of the rotation speed (output-side rotation speed of the friction element) detected by the rotation speed sensor 52 is determined to be the opposite direction, and the calculated rotation speed difference in the forward clutch 62 becomes smaller than the actual rotation speed difference, and the calculated required lubricant flowrate also becomes smaller.

However, according to this embodiment, for a period of predetermined time (time t21 to t22) after the select position is switched from the R position to the D position, the second oil pump 5 is driven, and the lubricant flowrate supplied to the forward clutch 62 is increased and thus, the lubricant flowrate supplied to the forward clutch 62 exceeds the actually required lubricant flowrate at all times, and defective lubrication of the forward clutch 62 does not occur.

Moreover, after the predetermined time has elapsed since the specific select operation and it is determined that the detected value of the rotation speed sensor 52 becomes zero (time t22 and after), the control proceeds to the normal flowrate control and after that, the second oil pump 5 is driven only in a state in which the lubricant flowrate runs short only with the discharge flowrate of the first oil pump 4. As a result, deterioration of fuel efficiency caused by unnecessary driving of the second oil pump 5 can be prevented.

Moreover, in the example illustrated in FIG. 6, since the vehicle speed is higher than the threshold value, the above-described flowrate control in specific select operation is executed, but if the vehicle speed is lower than the threshold value, the rotation speed difference in the forward clutch 62 is small, and even if the lubricant flowrate to the forward clutch 62 runs short, the forward clutch 62 is not deteriorated by overheat. In such a case, the above-described flowrate control in specific select operation is not executed (S2 to S6 in FIG. 3). As a result, too, deterioration of the fuel efficiency caused by unnecessary driving of the second oil pump 5 can be prevented.

Subsequently, a partial variation of this embodiment will be described.

In the flowrate control in specific select operation of the above-described embodiment, shortage of the lubricant amount supplied to the friction element corresponding to the select position is prevented by driving the second oil pump 5 immediately after the specific select operation and also if the vehicle speed is higher than the threshold value. However, it may be so configured that the detected value of the rotation speed sensor 52 immediately before the specific select operation is held (stored), and the normal flowrate control is executed on the basis of the held detected value.

Figure 7:
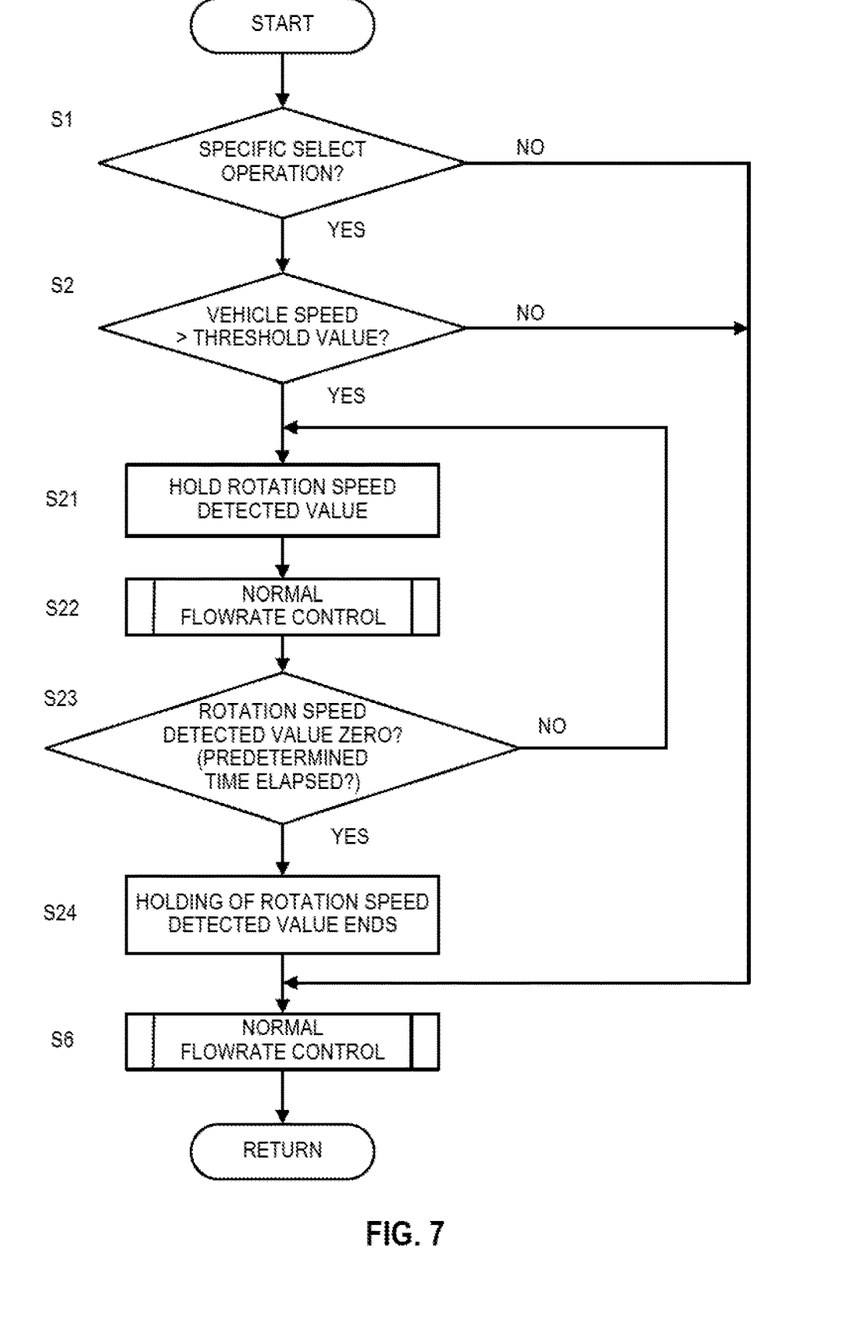
FIG. 7 is a flowchart illustrating the contents of the main routine of the lubricant flowrate control (variation).

FIG. 7 is a flowchart illustrating contents of the main routine of the lubricant flowrate control executed by the integrated controller 50 in this case. In the flowchart in FIG. 7, as compared with the flowchart illustrated in FIG. 3, the processing at S3 to S5 is replaced by processing at S21 to S26.

According to this, immediately after the specific select operation is performed and also if the vehicle speed is higher than the threshold value, the closest detected value of the rotation speed sensor 52, that is, the detected value of the rotation speed sensor 52 immediately before the specific select operation is held (S21), and the normal flowrate control is executed on the basis of this (S22). Since the detected value of the rotation speed sensor 52 immediately before the specific select operation is used for the calculation of the rotation speed difference, the rotation speed difference in the friction element corresponding to the select position is calculated higher than the actual rotation speed difference and the rotation speed difference calculated on the basis of the detected value of the rotation speed sensor 52 at that time in the normal flowrate control.

As a result, to the friction element corresponding to the select position, the lubricant flowrate larger than an actually required lubricant flowrate or the lubricant flowrate corresponding to the rotation speed difference calculated on the basis of the detected value of the rotation speed sensor 52 is supplied.

The increase of the lubricant flowrate to the friction element corresponding to the select position is continued until it is determined that the detected value of the rotation speed sensor 52 becomes zero (S23), and after it is determined that the detected value of the rotation speed sensor 52 becomes zero, holding of the detected value of the rotation speed sensor 52 is finished, and the control returns to the normal lubricant control (S24, S6).

Figure 8:
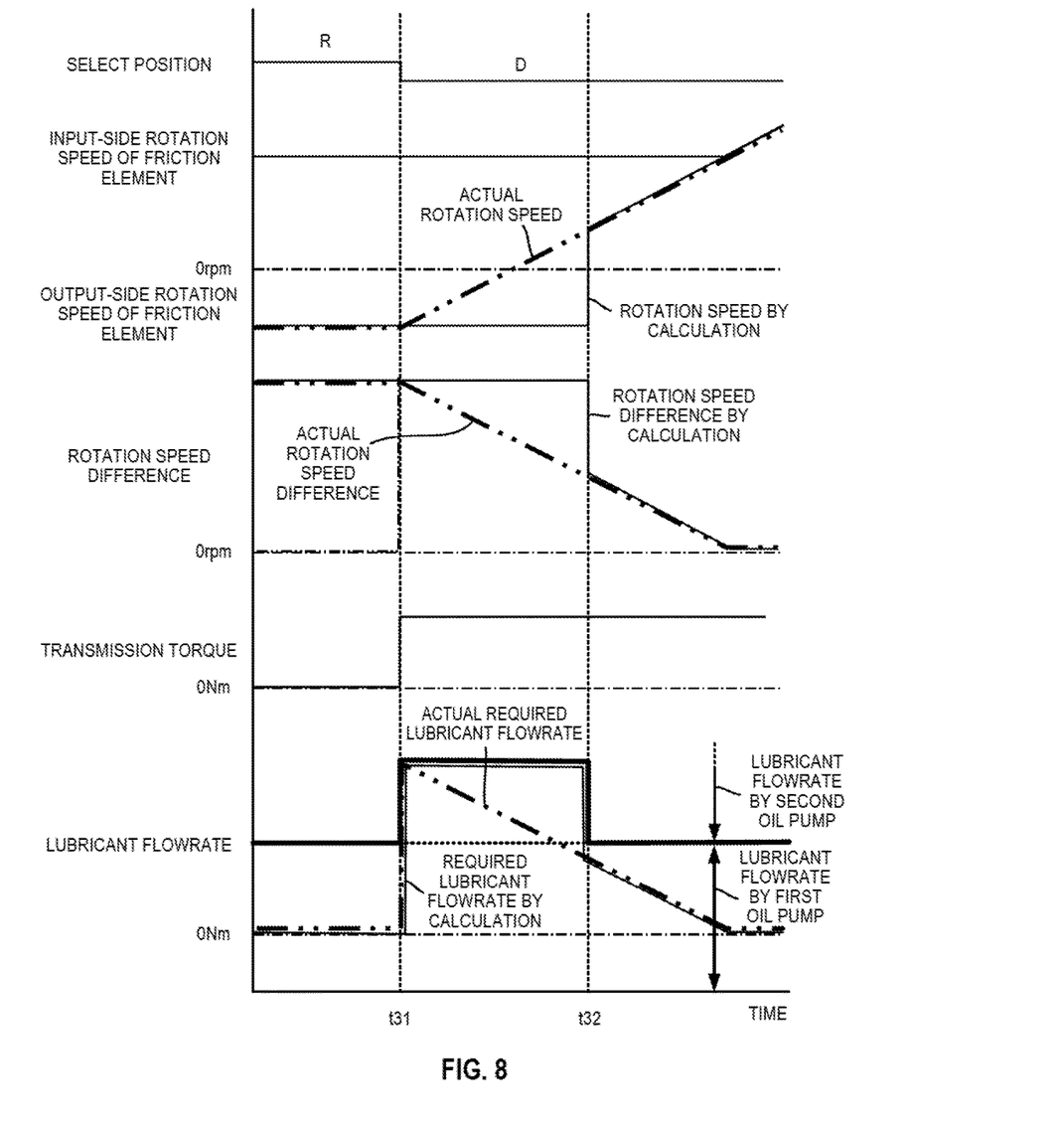
FIG. 8 is a time chart illustrating a state immediately after the R-D select operation (variation).

FIG. 8 is a time chart illustrating a state immediately after the select position of the CVT 7 is switched from the R position to the D position in the variation.

In the variation, by using the detected value of the rotation speed sensor 52 immediately before the specific select operation for the calculation of the rotation speed difference for a period of predetermined time (time t31 to t32) since the specific select operation was performed, the calculated rotation speed difference becomes higher than the actual rotation speed difference or the rotation speed difference calculated on the basis of the detected value of the rotation speed sensor 52 at that time and the calculated required lubricant flowrate is increased for that portion.

Then, if the calculated required lubricant flowrate exceeds the lubricant flowrate that can be supplied only by the first oil pump 4, the second oil pump 5 is driven, and the lubricant flowrate supplied to the forward clutch 62 is increased. Thus, the lubricant flowrate supplied to the forward clutch 62 exceeds the actually required lubricant flowrate at all times, and defective lubrication of the forward clutch 62 does not occur.

The embodiment of the present invention has been described, but the above-described embodiment only illustrates a part of an application example of the present invention and is not intended to limit the technical range of the present invention to the specific configuration of the above-described embodiment.

For example, the increase of the lubricant flowrate supplied to the friction element corresponding to the select position by driving the second oil pump 5 is continued until it is determined that the detected value of the rotation speed sensor 52 becomes zero, but it may be continued until engagement of the friction element corresponding to the select position is completed.

If the rotation speed of the friction element corresponding to the select position is close to zero, a detection period of a pulse becomes longer depending on a resolution of the rotation speed sensor 52, and determination on whether or not the rotation speed becomes zero becomes difficult. If it is erroneously determined that the rotation speed becomes zero before the rotation speed becomes zero, the increase of the lubricant flowrate supplied to the friction element corresponding to the select position ends early, and it is likely that the required lubricant flowrate is not supplied.

However, if it is continued until engagement of the friction element corresponding to the select position is completed, such nonconformity caused by the resolution of the rotation speed sensor 52 can be prevented. Whether or not engagement of the friction element corresponding to the select position is completed can be determined on the basis of whether or not the rotation speed of the friction element has becomes the rotation speed after engagement.

Moreover, when the second oil pump 5 is driven in the specific select operation, the second oil pump 5 is driven so that the discharge flowrate of the second oil pump 5 becomes the maximum, but the discharge flowrate of the second oil pump 5 may be set to a value corresponding to a heat generation amount in the friction element corresponding to the select position. For example, since the larger the vehicle speed, a road surface gradient and an accelerator opening degree in the specific select operation are, the larger the heat generation amount becomes, the second oil pump 5 may be driven so that the discharge flowrate of the second oil pump 5 becomes larger.

Moreover, the lubricant flowrate supplied to the friction element corresponding to the select position may be increased by providing an accumulator instead of the second oil pump 5, by accumulating the lubricant in the accumulator and by supplying the lubricant accumulated in the accumulator to the friction element corresponding to the select position in the specific select operation.

Moreover, by making the first oil pump 4 a pump capable of changing the discharge flowrate, the lubricant flowrate supplied to the friction element corresponding to the select position may be increased by increasing the discharge flowrate of the first oil pump 4 instead of driving of the second oil pump 5. According to this configuration, the above-described flowrate control in specific select operation can be performed without providing the second oil pump 5.

Moreover, if the lubricant flowrate supplied to the friction element corresponding to the select position can be changed by the hydraulic control valve unit 71, the lubricant flowrate supplied to the friction element corresponding to the select position may be increased by increasing a ratio of the lubricant flowrate supplied to the friction element in the discharge flowrate of the first oil pump 4 instead of driving of the second oil pump 5. According to this configuration, too, the above-described flowrate control in specific select operation can be performed without providing the second oil pump 5.

Moreover, an increase amount of the lubricant flowrate supplied to the friction element corresponding to the select position may be changed between immediately after the reverse position is switched to the forward position and immediately after the forward position is switched to the reverse position. For example, if the forward clutch 62 has a facing area smaller than the reverse brake 63, the increase amount of the lubricant flowrate immediately after the reverse position is switched to the forward position is made larger than the increase amount of the lubricant amount immediately after the forward position is switched to the reverse position.

The present application claims a priority of Japanese Patent Application No. 2013-56889 filed with the Japan Patent Office on Mar. 19, 2013, all the contents of which are hereby incorporated by reference.

The invention claimed is:

1. A lubricant flowrate control device for controlling a lubricant flowrate supplied to an automatic transmission provided with a forward friction element engaged when a forward position is selected and a reverse friction element engaged when a reverse position is selected between a driving source and a driving wheel, comprising:
   a required lubricant flowrate calculating unit adapted to calculate a required lubricant flowrate required for lubricating the friction element corresponding to a selected position on the basis of a rotation speed difference in the friction element corresponding to the selected position; and
   a lubricant flowrate controlling unit adapted to supply the required lubricant flowrate to the friction element corresponding to the selected position, wherein
   the lubricant flowrate controlling unit is configured to increase the lubricant flowrate supplied to the friction element corresponding to the selected position immediately after switching is made between the forward position and the reverse position and supply the lubricant flowrate larger than the required lubricant flowrate to the friction element corresponding to the selected position.

2. The lubricant flowrate control device according to claim 1, further comprising:
   a first oil pump driven by the driving source; and
   a second oil pump driven by a driving source different from the driving source, wherein
   the lubricant flowrate controlling unit is configured to increase the lubricant flowrate supplied to the friction element corresponding to the selected position by driving the second oil pump immediately after switching is made between the forward position and the reverse position.

3. The lubricant flowrate control device according to claim 2, wherein
   the lubricant flowrate controlling unit is configured to increase the lubricant flowrate supplied to the friction element corresponding to the selected position by driving the second oil pump so that a discharge flowrate becomes maximum immediately after switching is made between the forward position and the reverse position.

4. The lubricant flowrate control device according to claim 2, wherein
   the second oil pump is an electric oil pump driven by a battery.

5. The lubricant flowrate control device according to claim 1, further comprising:
   an oil pump driven by the driving source, wherein
   the lubricant flowrate controlling unit is configured to increase the lubricant flowrate supplied to the friction element corresponding to the selected position by increasing a discharge flowrate of the oil pump immediately after switching is made between the forward position and the reverse position.

6. The lubricant flowrate control device according to claim 1, further comprising:
an oil pump driven by the driving source, wherein
the lubricant flowrate controlling unit is configured to increase the lubricant flowrate supplied to the friction element corresponding to the selected position by increasing a ratio of a portion supplied to the friction element corresponding to the selected position in a discharge flowrate of the oil pump immediately after switching is made between the forward position and the reverse position.

7. The lubricant flowrate control device according to claim 1, wherein
the required lubricant flowrate calculating unit is configured to hold an output rotation speed immediately before the switching of the friction element corresponding to the selected position is made immediately after switching is made between the forward position and the reverse position and calculate the required lubricant flowrate on the basis of the held output rotation speed; and
the lubricant flowrate controlling unit is configured to increase the lubricant flowrate supplied to the friction element corresponding to the selected position by supplying the required lubricant flowrate calculated on the basis of the held output rotation speed to the friction element corresponding to the selected position.

8. The lubricant flowrate control device according to claim 1, wherein
the lubricant flowrate controlling unit is configured to continue an increase of the lubricant flowrate supplied to the friction element corresponding to the selected position at least until a detected value of a sensor detecting an output rotation speed of the friction element corresponding to the selected position becomes zero and after that, supply the required lubricant flowrate to the friction element corresponding to the selected position.

9. The lubricant flowrate control device according to claim 1, wherein
the lubricant flowrate controlling unit is configured to continue an increase of the lubricant flowrate supplied to the friction element corresponding to the selected position for a predetermined period of time and after that, supply the required lubricant flowrate to the friction element corresponding to the selected position.

10. The lubricant flowrate control device according to claim 1, wherein
the lubricant flowrate controlling unit is configured to continue an increase of the lubricant flowrate supplied to the friction element corresponding to the selected position until engagement of the friction element corresponding to the selected position is completed and after that, supply the required lubricant flowrate to the friction element corresponding to the selected position.

11. The lubricant flowrate control device according to claim 1, wherein
the lubricant flowrate controlling unit is configured to increase the lubricant flowrate supplied to the friction element corresponding to the selected position immediately after switching is made between the forward position and the reverse position and if a vehicle speed is at a predetermined vehicle speed or more.

12. A lubricant flowrate control method for controlling a lubricant flowrate supplied to an automatic transmission provided with a forward friction element engaged when a forward position is selected and a reverse friction element engaged when a reverse position is selected between a driving source and a driving wheel, comprising:
calculating a required lubricant flowrate required for lubricating a friction element corresponding to a selected position on the basis of a rotation speed difference in the friction element corresponding to the selected position; and
increasing a lubricant flowrate supplied to the friction element corresponding to the selected position immediately after switching is made between the forward position and the reverse position and supplying a lubricant flowrate larger than the required lubricant flowrate to the friction element corresponding to the selected position.

13. A lubricant flowrate control device for controlling a lubricant flowrate supplied to an automatic transmission provided with a forward friction element engaged when a forward position is selected and a reverse friction element engaged when a reverse position is selected between a driving source and a driving wheel, comprising:
required lubricant flowrate calculating means for calculating a required lubricant flowrate required for lubricating the friction element corresponding to a selected position on the basis of a rotation speed difference in the friction element corresponding to the selected position; and
lubricant flowrate controlling means for supplying the required lubricant flowrate to the friction element corresponding to the selected position, wherein
the lubricant flowrate controlling means increases the lubricant flowrate supplied to the friction element corresponding to the selected position immediately after switching is made between the forward position and the reverse position and supplies the lubricant flowrate larger than the required lubricant flowrate to the friction element corresponding to the selected position.

* * * * *